United States Patent [19]  [11] 4,101,356
Savelkouls  [45] Jul. 18, 1978

[54] METAL COATING PROCESS

[75] Inventor: Leonardus Joseph Savelkouls, Bergschenhoek, Netherlands

[73] Assignee: Progress Processing Limited, Vaduz, Liechtenstein

[21] Appl. No.: 844,525

[22] Filed: Oct. 25, 1977

[30] Foreign Application Priority Data

Nov. 5, 1976 [NL] Netherlands ................ 7612325

[51] Int. Cl.$^2$ .................... E04B 2/00; B29C 19/02
[52] U.S. Cl. .................... 156/71; 156/272
[58] Field of Search .................... 156/272, 380, 71

[56] References Cited

U.S. PATENT DOCUMENTS

| 2,649,876 | 8/1953 | Thompson et al. | 156/380 |
| 2,649,877 | 8/1953 | Renn | 156/380 |
| 3,556,887 | 1/1971 | Adcock et al. | 156/272 |
| 3,652,361 | 3/1972 | Leatherman | 156/272 |

Primary Examiner—Douglas J. Drummond
Attorney, Agent, or Firm—Werner W. Kleeman

[57] ABSTRACT

Metal substrates, such as steel sheeting or steel plates of large containers and similar structures, are coated in a continuous operation by arranging a polymer stratum that comprises a heat or melt bonding composition in contact with the metal substrate and by directing electromagnetic radiation in the radio frequency range through the polymer stratum without substantially heating the latter onto the substrate for briefly heating a surface area of the substrate to a temperature where the heat or melt bonding composition in contact with the substrate is activated to form a heat or melt bonded connection between the polymer stratum and the metal substrate. The heated surface area is moved continuously so as to bondingly coat the surface of the substrate, e.g. the fuel-receiving compartments of a tanker, with the polymer stratum. An apparatus for the coating process is disclosed and comprises an inductor loop for directing radio-frequency radiation through the polymer stratum onto the metal substrate. The inductor loop can be made to conform with the surface of the substrate that is to be coated and made resistant against corrosion.

13 Claims, 8 Drawing Figures

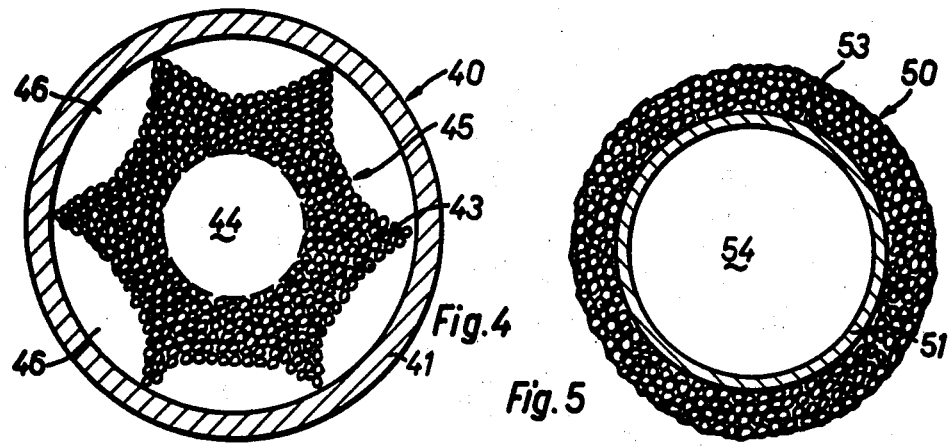
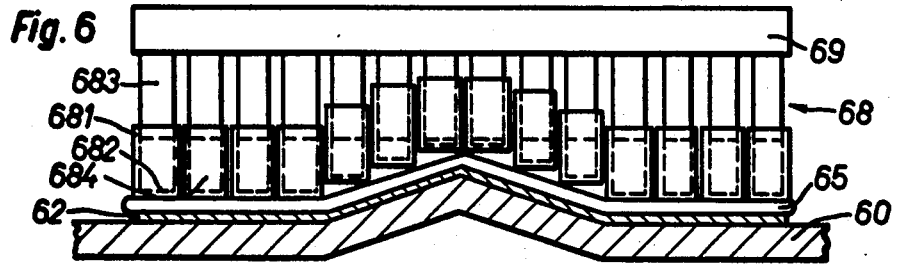
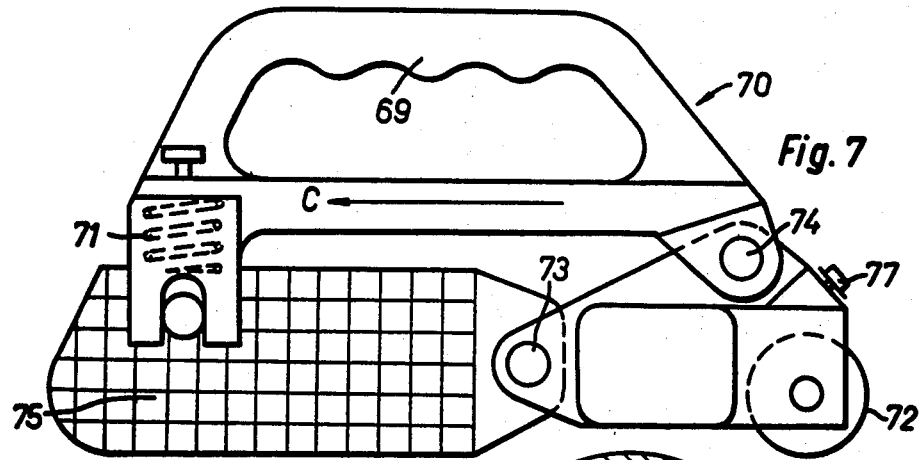
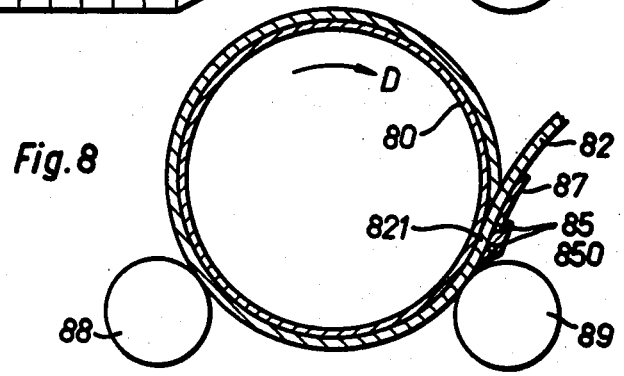

1

METAL COATING PROCESS

BACKGROUND OF THE INVENTION

1. Field of the Invention

The present invention generally relates to the art of coating metal substrates with polymer layers and more particularly to a process for bondingly connecting a polymer layer and a large metal substrate having a substantially plane or curved surface that is to be made resistant to corrosion.

2. Description of the Prior Art

Various methods are known to coat metals with polymer compositions or plastics so as to protect the metal surface against corrosion. As many synthetic polymers that would be desirable as anti-corrosion strata cannot be processed commercially in the form of paints or lacquers, various coating methods have been developed during the last two decades. Representative examples are plastisol coating, the fluidized bed method including electrostatic spraying, flame spraying, cast or rotational lining, vacuum coating and the like. This art is summarized for example in Europlastics Monthly (February/March, 1974, pages 59–63). A problem common to most of these prior art methods that involve heating and substantial fusion of the polymer is the appearance of tensions within the coating believed to be due to shrinking of the polymer coat when the latter solidifies.

Use of preformed polymer strata, e.g. films or sheets that are cemented or otherwise adhesively bonded onto the substrate without overall fusion or melting of the preformed polymer stratum would obviate shrinkage tension problems and substantial efforts have been made to develop suitable adhesive compositions.

One of the most promising technologies in this field is based upon the so-called heat or melt bonding adhesives. Many compositions of this type are disclosed in the literature and U.S. Pat. Nos. 2,405,950, 2,838,437, 2,953,551, 3,027,346, 3,264,272, and 3,267,083 are mentioned but as examples. Modification of the polymer chain of a normally non-bonding polymer, such as an olefin, e.g. polyethylene, by carboxylic groups (free acid groups, esters or salts) introduced, for example, by copolymerizing alkylene, e.g. ethylene and an $\alpha,\beta$-unsaturated carboxylic acid, e.g. acrylic acid, is one of the commercially more important methods for producing heat or melt bonding polymers capable of serving as an intermediate bonding layer between a metal substrate and a polymer coating layer.

The application of heat or melt bonding layers for coating of metal substrates is disclosed, for example, in British patent specification No. 864,879, in French Pat. No. 2,012,338 and in U.S. Pat. No. 3,981,762.

A general approach of the prior art heat or melt bonding techniques for metal coating purposes can be summarized as follows: metal substrates are coated with an organic polymer composition by providing a polymer stratum that includes a heat or melt bonding composition in a contacting relation with the metal substrate, heating and subsequently cooling the metal substrate so as to form a strong interbonding connection between the bonding composition and the metal substrate. Various heating methods have been used in these prior art processes, including electromagnetic radiation, such as infrared radiation ($3 \cdot 10^{11}$ to $3.8 \cdot 10^{14}$ cycles per second).

High frequency electromagnetic radiation in the range of megacycles ($10^6$) per second to gigacycles ($10^9$) per second is well known for many heating purposes including thermoplastics welding, bonding, curing and the like. The general concept of high frequency heating including high frequency welding of plastics seems to be based upon the concept that non-conductive organic insulating materials are heated in the high frequency field of a capacitor, e.g. by arranging the material that is to be heated between a pair of capacitor plates of a high frequency circuit. On the other hand, electromagnetic induction heating of metals is well known in the art of metallurgy and conventional metal melting devices operate in the frequency range of from about 200 to 20,000 cycles per second.

In accordance with the present invention it has been found that substantial advantages can be achieved by using electromagnetic radiation within a specified frequency range in the heating step of the prior art heat or melt bonding techniques for coating metal substrates as defined above. As will be explained in more detail below, such radiation will permeate a polymer stratum without substantial heating thereof and yet will cause a localized surface heating of a metal substrate arranged in contact with and under the polymer stratum.

SUMMARY OF THE INVENTION

Hence, according to the invention, the prior art method of coating a metal substrate with an organic polymer composition by providing a polymer stratum that includes a heat or melt bonding composition in a contacting relation with the metal substrate is improved by using electromagnetic radiation in a specified frequency range so as to avoid both the direct generation of heat in the polymer stratum, i.e. a maximum frequency of well below those employed in the welding of plastics, as well as excessive, i.e. overall heating of the metal substrate, i.e. a minimum frequency above the frequency range used for metal melting and generally above 100 kilocycles. Electromagnetic radiation in the frequency range of from about 100 kilocycles per second (or Kilohertz, kHz) to less than 1000 kilocycles per second (Megahertz, MHz) can be said to constitute the radio frequency (middle wave radio transmission) range. Thus, according to the invention, a predetermined surface portion of the metal substrate can be caused to briefly reach a temperature which is just sufficient to activate or melt a surface portion of the heat or melt bonding composition that is in physical contact or in a "contacting relation" with the radiation-heated surface portion of the metal substrate.

Losses of energy due to heating of areas where no heat is required — i.e. in the metal substrate below the bonding interface as well as in the polymer stratum above the bonding interface — and undue losses of time for heating up and cooling down the bonding area can be avoided according to the invention.

Thus, according to a preferred general embodiment of the above method, the invention comprises the steps of continuously moving a source of electromagnetic radiation having a frequency in the radio frequency range relative to and over the polymer stratum near a surface thereof that is not in contact with the metal substrate for directing the radiation through the polymer stratum without heating thereof onto the metal substrate in an area where said metal substrate is in contacting relation with the stratum and for briefly heating a surface portion of said metal substrate in said area by said radiation to a temperature at which said heat or melt bonding composition is capable of forming said interbonding connection, and continuously moving said area by said movement of said source of said electromagnetic radiation relative to said stratum.

According to another embodiment, the invention provides for an apparatus suitable for use in carrying out the inventive method and comprising a means for generating electromagnetic radiation in the radio frequency range and an emitter connected with said generating means; the emitter is an inductor loop shaped to substantially conform with a linear extension of the metal substrate to be coated according to the inventive process.

In a preferred embodiment of the apparatus, the inductor loop is flexible.

BRIEF DESCRIPTION OF THE DRAWINGS

The present invention is illustrated by way of example and not limitation in the figures of the accompanying drawings in which:

FIGS. 4 and 5 are cross-sectional views of flexible inductor tubes suitable for use in an embodiment of the invention;

FIG. 6 is a semi-diagrammatic front view of a flexible inductor as shown in FIGS. 4 and 5 associated with a multi-membered support for conforming the inductor with an irregular surface of a substrate;

FIG. 7 is a semi-diagrammatic side view of an apparatus for manual operation suitable in another embodiment of the inventive process, and FIG. 8 is a diagrammatic view showing continuous coating of a steel tube or pipe according to the inventive process.

DESCRIPTION OF PREFERRED EMBODIMENTS

Figure 1:
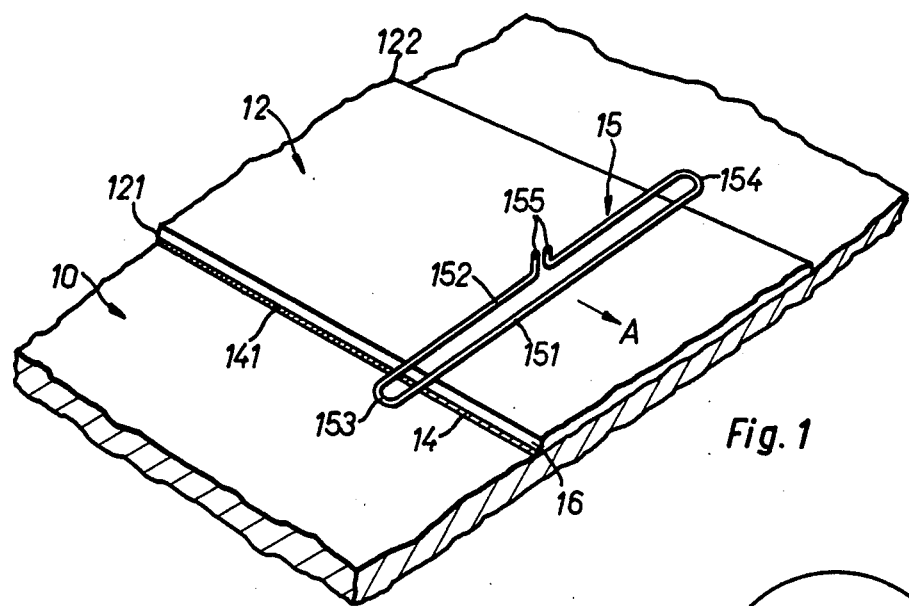
FIG. 1 is a diagrammatic perspective view of a metal substrate portion with a polymer stratum laid on the surface of the substrate and with the emitting portion of a source of radio frequency radiation being moved over the stratum for interbonding with the substrate according to an embodiment of the inventive process.

In FIG. 1, a broken-away portion of metal substrate 10, e.g. a steel plate of a large container is shown in contacting relation with a broken-away portion of a polymer stratum 12 laid onto substrate 10 as continuous web having side edges 121, 122. Stratum 12 is an integral laminate consisting of a layer 14 of a heat or melt bonding polymer composition and of a top or coat layer 16 of a second polymer composition.

A source of radio frequency electromagnetic radiation in the form of a loop-shaped inductor 15 (with the radiation generator not shown for better understanding) is moved over the polymer stratum 12 in the direction of arrow A. Inductor 15 consists of a tube made of a metal, such as copper, and is formed to have two adjacent and parallel longitudinal extensions or arms 151, 152 interconnected by two 180° turns or bends 153, 154. Two upwardly extending end portions 155 are shown with their terminal portions (coupling with an oscillator not shown) broken away. A continuous stream of a cooling fluid, such as water, is passed through inductor 15 so as to cool the latter to a temperature below 100° C, preferably between 10° and 50° C.

Both inductor portions 151, 152 are coplanar so as to contact the upper surface of stratum 12. Preferably, some physical pressure is exerted by inductor 15 during its movement in the direction of arrow A. Radio frequency radiation is emitted by inductor 15 as explained in more detail below. An inductor support (not shown in FIG. 1) extends over the inductor loop and serves to direct the predominant portion of the radiation emitted by inductor 15 through both layers of stratum 12 (without heating either) and onto the upper surface of substrate 10, substantially in the area covered by the inductor 15. Heat is induced in the substrate at or near its surface portion near layer 14 of stratum 12. Such heat is conveyed by physical contact to the heat or melt bonding polymer of layer 14 and activates the bonding function thereof, e.g. by fusion of a portion at least of layer 14. The contacting relation includes some pressure between layer 14 and substrate 10 and a strong interbonding connection at the layer 14/substrate 10 interface is achieved due to either (a) thermally induced reaction of the curing or heat-setting type, or/and (b) solidification of molten layer 14 material when inductor 15 continues its movement in the direction of arrow A and thus ceases to heat the first mentioned area. As the temperature in this area drops rapidly due to heat dispersion into the lower part of substrate 10, solidification of a melt bonding layer 14, or the interface portion thereof with substrate 10, occurs most rapidly. As shown in FIG. 1, layer 14 interbondingly connects top layer 16 and substrate 10 in all those areas 141 that were in the path of movement of inductor 15.

As is apparent, a very large steel substrate 10 can thus be coated continuously with a substantially uniform layer of polymer stratum 12 by heat or melt bondingly connecting a number of parallel elongated webs of stratum 12 in edge-to-edge contact so as to cover any desired portion, and preferably all of the corrosion-exposed surface, of substrate 10.

Use of a single elongated inductor loop extending from one edge 121 to the opposite edge 122 of stratum 12 — and preferably extending somewhat over each edge as indicated in FIG. 1 — is preferred, but more than one inductor, e.g. one after the other or several side by side, may be used and/or the shape of the surface area encompassed by the periphery of the inductor may be modified.

Figure 2:
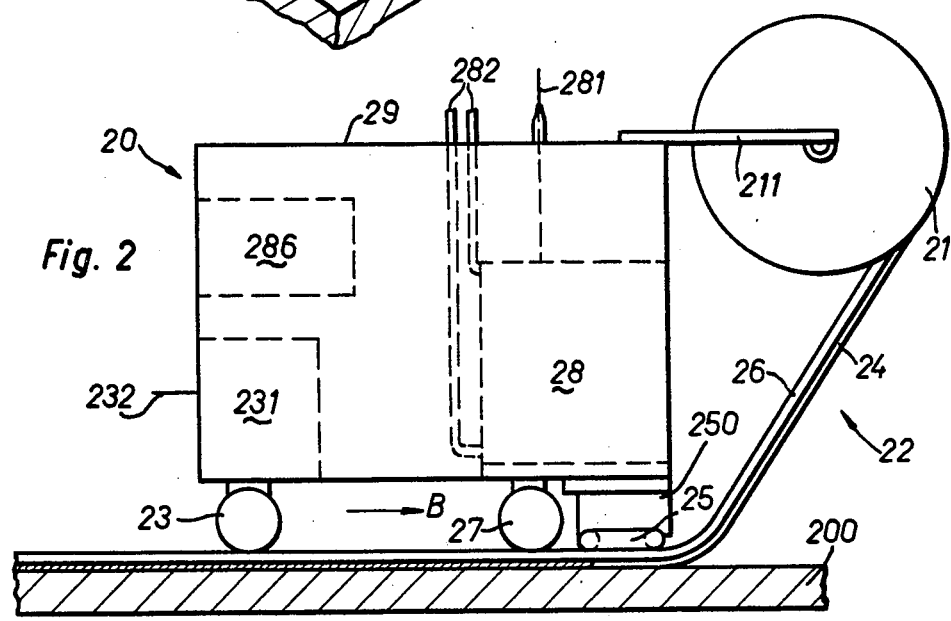
FIG. 2 is a semi-diagrammatic side view of an apparatus for carrying out the process as illustrated in FIG. 1.

FIG. 2 depicts a semi-diagrammatic side view of an apparatus 20 for carrying out the process explained in connection with FIG. 1. A storage drum 21 is attached via a bracket 211 with housing 29 and provides a continuous web 22 of a laminate as explained above having a top or coat layer 26 and a heat or melt bonding layer 24. Apparatus 20 further includes a coupling circuit 28 supplied via line 281 with a high frequency current supplied from an oscillator circuit (not shown) and ducts or pipes 282 for passing a cooling fluid through inductor 25 and the coupling circuit 28, if required.

A pressure roller 27 is provided to press stratum 22 (the thickness of which is exaggerated in FIG. 2) onto ferrous substrate 200. Further, a drive roller 23 (or, alternatively, a non-rotatable sliding support or non-driven rotatable support) is provided and connected in a manner not shown with a drive 231, e.g. an electric motor supplied with power via line 232. Any capacitor means 286 required for coupling circuit 28 may also be included in housing 29.

When apparatus 20 is moved due to controlled actuation of drive 231 by drive roller 23 in the direction of arrow B over the stationary substrate 200, a continuous length of web 22 will be applied thereonto and interbondingly connected by activation of the heat or melt bonding polymer provided as layer 24 of the laminated polymer stratum 22 with substrate 200 when inductor 25 generates heat at or near the surface of the substrate 200 and when stratum 22 is pressed thereonto, preferably both by inductor 25 and/or its shield or support 250 and by pressure roller 27.

Apparatus 20 has also and successfully been used to apply a laminated polymer stratum onto a practically vertical wall. For this purpose, a pair of slide bars has been mounted parallel to the vertical wall and with a distance from the wall corresponding to the height of the cover plate of the housing. The apparatus then has been lifted by means of a traction rope and forced against the wall by the pair of slide bars.

Figure 3:
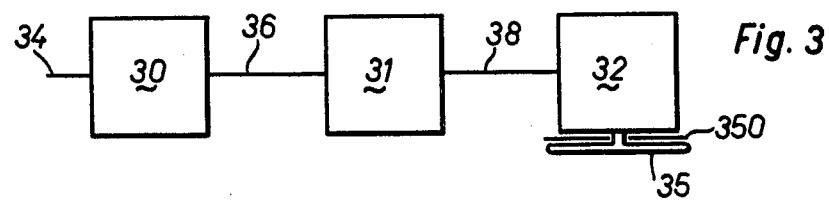
FIG. 3 is a block diagram illustrating the generation of radio frequency radiation from normal AC current.

FIG. 3 is a block diagram showing the main steps of conventional generation of radio frequency radiation. Normal AC, e.g. from a 220 or 380 Volt and 50 or 60 Hz power line is supplied via input 34 to transformer 30 for producing a high-voltage current, e.g. 15,000 to 50,000 Volts having the original 50 or 60 Hz frequency. Connection 36 supplies this current to oscillator circuit 31 to produce the desired high frequency current which is conveyed via connection 38 to coupling circuit 32. Inductor 35 is coupled by circuit 32 with the high frequency produced in 31 and generates electromagnetic radiation. Shielding means 350, e.g. as an inductor support preferably made of a paramagnetic or diamagnetic metal, directs the radiation produced away from circuit 32. Of course, two or more of the units 30, 31, 32 can be combined into a single apparatus, or kept as separate apparatus components with interconnecting conduits.

It will be understood by the expert that conformity of the inductor and the shape of the surface in relative movement to the inductor is desirable and the straight linear structure of inductors 15 and 25 in FIGS. 1 and 2 is in conformity with the substantially plane surface of substrates 10 and 200. The desired conformity of the substrate surface that is to be coated and the inductor for other than substantially plane configurations can be achieved, according to an aspect of the invention, either (a) by bendingly deforming a non-flexible inductor, e.g. one of its side or intermediate portions being curved, bent or offset in conformity with a continuous protrusion, indentation, edge or the like, of the substrate (for example, where a horizontal substrate surface is connected, or extends into, a vertical or inclined surface); or (b) by providing a deformable or flexible inductor.

Alternative (b) is explained, by way of preferred examples, in FIG. 4 and FIG. 5 showing an enlarged cross-sectional view of a tubular structure to be used for the inductor loop instead of the substantially rigid metal tube mentioned above.

Tube 40 consists of flexible non-metallic and liquid-impervious wall 41, preferably a heat-resistant polymer, such as a fluoro polymer, e.g. poly(tetrafluoro ethylene), and a flexible metallic core member 45 formed by a plurality of metal filaments 43, e.g. copper wire. A continuous interior duct 44 may be provided at the center portion of core member 45 but is not believed to be critical.

Channel or duct means 46 between core 45 and tube wall 41 are essential, however, for effective cooling of the inductor by passing a substantially non-attenuating (for the radiation) cooling fluid. The number of ducts 46 is not critical as the essential criterion is that of permitting a sufficient coolant effect or flow. Coolant may be passed through the optional center portion 44.

In FIG. 5, tube 50 comprises a flexible outer tube, e.g. made of a plurality of wires 53, such as copper wires. As the flexible metal tube is not impervious to a fluid coolant, an inner sealing tube 51 of a flexible fluid-impervious material, e.g. a synthetic plastic material, is provided. Coolant is passed through the continuous central duct 54 of tube 50 but as the radiation does not pass through the coolant, it need not be non-attenuating. Sealing tube 51 is sufficiently thin and/or sufficiently heat conductive to permit the desired heat exchange between flexible metal portion of tube 50 and the coolant in duct 54.

The circular shape of the overall cross-sections of FIG. 4 is not believed to be essential nor a circular cross-section of lining tube 51 or of wires 43, 53.

Another (not shown) embodiment of the inductor consists of a flexible and preferably flat strand of copper drawn into a plastic tube.

FIG. 6 illustrates but one example of how to continuously conform an inductor loop made of flexible tube materials of the type shown in FIGS. 4 and 5 to an irregular surface of a substrate 60. Polymer stratum 62 — a laminate as explained above or a stratum of a heat or melt bonding polymer composition — is pressed onto the upper surface of substrate 60 by the flexible inductor loop 65 which, in turn, is pressed onto polymer stratum 62 by a plurality of piston/cylinder means 68 supported by a frame or bar 69. Each of means 68 consists of a cylinder 681 having a closed bottom face 682 and a piston 683 that can enter into cavity 684 at a depth that depends upon the distance between bar 69 and the contacting portion of the flexible inductor loop 65. When the outer wall portion of loop 65 is made of a non-metallic material, the contacting edges of the cylinders can be modified, e.g. rounded, to prevent damages in prolonged operation.

Actuation for piston/cylinder means 68 can be conventional hydraulic, pneumatic or mechanical means including spring loading or gravitational effects.

FIG. 7 illustrates an apparatus 70 for manually applying a coating as indicated above onto a metal substrate by the inventive process. Inductor portion 75 is pressed onto the polymer stratum (not shown) by means of handle 69. Spring means 71 are provided for controlling operation of the inductor in dependence upon the manual pressure applied. Roller 72 — optionally driven by a motor not shown and controlled by adjustment 77 — can be used for additionally pressing the polymer stratum onto the substrate and/or to control the operating speed (velocity of movement of apparatus 70 in the direction of arrow C). Hinge connections 73, 74 are of advantage for coating curved surfaces of a substrate. The feed line or lines for supplying the current required for actuation of inductor 75 or/and for coolant are not shown in FIG. 7.

FIG. 8 shows a diagrammatic illustration of another embodiment of the inventive process. Whereas the metal substrate in the above illustrated embodiments is stationary, FIG. 8 illustrates movement of the substrate, a steel tube or pipe 80 that is supported by two rollers either or both of which is connected with a drive (not shown) so as to rotate tube 80 in the direction of arrow D. Inductor 85, on the other hand, is stationary. While an inductor support 850 serving as a radiation shield is shown, the coupling devices for generation of the radio frequency radiation (devices 30, 31, 32 of FIG. 3) are omitted for simplified presentation. A polymer stratum 82 similar to that shown in FIGS. 1 and 2 is supplied from a source (not shown) and is brought by a guide means 87 into contacting relation with substrate 80. Bonding is effected at or near stratum position 821 and roller 89 may serve to increase and/or maintain a desired contact pressure. By helically winding and bondingly connecting a continuous web of polymer stratum 82 onto tube 80, e.g. in the general manner shown in the above mentioned British Patent specification No. 864,879 but with the inventive step of using radio frequency radiation for heating but a surface portion of tube 80, a polymer coated steel tube of the type used in pipelines and the like can be produced in continuous process with the above mentioned advantage of the invention.

It is obvious for anybody skilled in the art that the embodiment of the new process as explained above for bonding a polymer stratum onto the outer surface of a tube can easily be adapted to bond a suitable stratum to the inner surface or wall of a tube.

In the embodiments of the inventive process illustrated above the actual temperature required at that surface portion of the metal substrate where activation (fusion and/or reaction) of the heat or melt bonding composition in contact with the substrate is desired will depend upon the specific heat or melt bonding composition used in the polymer stratum. As many such compositions of different classes are known in the art, no generally limiting temperatures can be specified. A typical temperature range for the activation of many heat or melt bonding compositions is in the range of from about 100° to about 250° C, preferably in the range of from about 120° to about 200° C.

When using a radiation source according to the invention in the form of an elongated inductor loop shaped to conform with a limited linear extension of that surface of the metal substrate which is to be coated, the temperature at the heat or melt bonding metal/polymer interface can be easily controlled by (a) the specific energy output of the radiation source and (b) the speed of the movement of the radiation source relative to the metal substrate. For example, when using the preferred elongated inductor loop 15, 25, 65, 85 with an overall length of about 1 meter in the form shown in FIG. 1, the actual loop length will be about twice the overall length, i.e. about 2 meters.

It has been found that a relatively low specific radiation energy of such an inductor in the order of about 25 Kilowatt per meter of actual loop length is well suited for many coating purposes of the type envisaged by the invention. For example, when moving such an inductor over a polymer stratum 12, 22, 62, 82 having a width (edge 121 to edge 122) of up to about 1 meter and relatively moving the inductor substantially normal to the web edges, the desired interbonding connection can be achieved at a speed of about 4–5 centimeters per second when operating with an acrylic modified polyolefin that has an activation temperature of about 150° C as melt bonding composition.

When the radiation energy is increased, for example, to the preferred value in the order of about 75 Kilowatt per meter of overall length of the inductor loop, the operating speed can be increased for the same heat or melt bonding temperature, or modified in view of a different bonding temperature.

The inventive process is generally applicable to the coating of ferromagnetic substrates. Preferred substrates are ferrous (iron and iron alloys including steel) sheets or plates and tubes. In view of the relatively low corrosion resistance of many conventional structural steels used for containers, ships, tubes and the like, application of a corrosion resistant coating, e.g. made of polyolefin, having a thickness in the range of from about 1 millimeter to about 20 millimeters to either or both surfaces of such structures is an important objective that can be achieved by the invention.

In general, preferred ferrous substrates will have a thickness in the range of from about 1 to about 20 mm. The upper limit is not critical at all while the lower limit is due to practical reasons.

It is critical for all embodiments of the inventive process that radiation within a particular frequency range is used, i.e. electromagnetic radiation having a frequency of at least about 100 kilocycles per second, preferably at least about 200 kilocycles per second, and below about 1000 kilocycles per second and preferably not more than about 800 kilocycles per second.

Radiation having a frequency of from about 400 to about 600 kilocycles is particularly preferred.

If the frequency is increased to above 800 kilocycles per second, the polymer stratum that will not be directly heated by radiation within the preferred range tends to become increasingly susceptive to radiation induced heating and undesired as well as uncontrolled melting would occur while, at the same time, no sufficient heat is induced in the surface portion of the metal substrate.

At frequencies of below about 200 kilocycles per second, the radiation will increasingly penetrate into the metal substrate and tend to overheat the latter at its surface portion so that the bonding effect of the heat or melt bonding polymer will be impaired, aside from energy losses mentioned previously.

Thus the invention in its process embodiment substantially depends upon selection of a particular frequency range as specified above for effecting the desired interbonding connection and, of course, no metallic matter should be contained in the polymer stratum.

As is known in the art of coating metals with heat or melt bonding polymers, the surface of the metal substrate to be covered will in general be cleaned, e.g. by sand-blasting or the like methods.

The polymer stratum applied to form the coating layer may include the heat or melt bonding composition as an outer layer of a laminate that has at least another layer of a second and normally non-bonding polymer. Production of such laminates, e. g. by co-extrusion, is known per se. The use of such laminates is preferred mainly for commercial reasons as most heat or melt bonding polymer compositions are more expensive than unmodified polymers. However, if the price aspect is not relevant or compensated by other factors, it is within the scope of the invention to apply a polymer stratum consisting essentially of a heat or melt bonding polymer so that the final coating layer applied onto the metal substrate according to the inventive methods consists of the heat or melt bonding polymer.

In general, the thickness of the polymer coating will be in the range of from about 0.3 mm to about 20 mm. A minimum coating thickness of about 1 mm is preferred for most purposes.

If the heat or melt bonding composition forms a layer of a plastics laminate, a minimum thickness of about 30 micrometers is preferred for the heat or melt bonding layer. The upper limit of the thickness of this layer is not critical. Laminates with a heat or melt bonding layer in the range of from 30 to 80 micrometers of the above mentioned carboxyl modified olefin type (e.g. sold under the Trademark "Surlyn" by E. I. du Pont de Nemours & Company, USA) are suitable. Other types of heat or melt bonding polymers from the thermoplastic, elastomeric and duroplastic classes are known and commercially available and details as to the bonding temperature, the bonding strength on metal substrates and the like are available from the manufacturers. For example, a heat bonding polymer for metal/polyamide ("Rilsan", nylon 12) is sold under the trade name "Rilprim" by ATO, France; a heat bonding polymer for polyvinyl chloride is sold under the trade name "LP 3" by Lonza, Switzerland, and a heat bonding polymer for polyethylene is sold under the trade name "SA-65" by Plastics Coating Limited, U.K. Polyfluorocarbons, such as "Teflon" may be heat bonded with a modified nitrile rubber base "4684" supplied by E. I. du Pont de Nemours & Company.

For many purposes of the invention, melt bonding polymers of the thermoplastic type having a low melt index, e.g. less than about 2, are preferred because a molten "bead" can be obtained at the bonding interface so that application of a light roller pressure on the polymer stratum in the bonding region (near the elongated inductor) will cause a sweep-barrier that is moved with the bonding region and prevents that air is entrapped at the bonding interface.

For the purpose of this invention, a "strong interbonding connection" between the metal substrate and the polymer coating is one where the peel strength is at least about equal to the inherent strength of the coating.

It also may be desirable to prepare a coating onto a metal substrate with the heat or melt bonding composition only. The adherence of such a composition which has been applied by brushing on can substantially be improved by heating the interface between the metal stratum and the abutting surface of the bonding composition according to the present invention.

In general, the second coating polymer, e. g. the top layer of a laminate, can be selected from the same classes as the heat or melt bonding polymer. Thermoplastic polymers, notably those of the polyolefin class, are a preferred species.

While prelaminating or precoating of the top layer of polymer with the heat or melt bonding polymer is preferred for many purposes, it may be desirable to apply the heat or melt bonding polymer, or a portion thereof, directly onto the metal substrate. Bonding is effected as above after the top layer is applied onto the prepared layer of the heat or melt bonding polymer.

While many prior art heat or melt bonding techniques for coating of metal substrates require particular cooling means, it is an advantage of the inventive process that interbonding can be achieved with very little heat energy at the bonding interface in the narrow zone defined by the elongated inductor. Thus, no particular cooling step is required and the desired interbond is formed in a given interface area as soon as the inductor has been moved over that area.

As mentioned above, supplemental pressuring means, such as a roll, can be used near the inductor so as to exert additional pressure onto the bonding interface while the latter is, or just was, heated by the radiation from the inductor. The length of such an associated roll should be substantially the same as that of the overall length of the elongated inductor.

Alternatively or complementary, the inductor loop proper and/or a supporting member thereof can be used to generate the desired pressure on the polymer stratum for obtaining the contacting relation.

With regard to details about the radiation source and the generation of electromagnetic radiation in the radio frequency range, reference is made to the literature relating to structure and operation of middle-wave radio transmitters.

Preferably, the inductor loop is made of a tubular structure including electrically conductive material and a passage for a coolant fluid. The associated inductor support can be made of a diamagnetic metal and will receive the inductor loop at the back side portion thereof so that the predominant portion of the emitted radiation will be directed away from the front side portion of the inductor, i.e. the side near to or in contact with the upper side of the polymer stratum.

As mentioned previously, the inductor plus the associated support should be in conformity with the surface of the metal substrate that is coated. A generally linear inductor provides such conformity with any substrate surface that can be contacted continuously over a limited length, e.g. 100 cm, by the linear inductor when moved relative to the substrate surface in a direction that is vertical to the main extension of the linear inductor. Accordingly, any such surface can be considered as "regular" or "plane" even if it has concave or convex portions, or is part of a cylinder.

Alternatively, the inductor loop may be generally circular and is then in conformity with a cylindrical substrate moved vertical relative to the circular plane defined by the circular inductor loop.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

Protection by Letters Patent of this invention in all its aspects as the same are set forth in the appended claims is sought to the broadest extent that the prior art allows.

What is claimed is:

1. In the process of coating a metal substrate with a substantially uniform layer of an organic polymer composition by providing a polymer stratum including a heat or melt bonding polymer composition in a contacting relation with said metal substrate, subjecting said metal substrate to electromagnetic radiation capable of heating said substrate for activation of said melt bonding composition, and allowing said metal substrate to cool so as to form a strong interbonding connection between said heat or melt bonding composition and said metal substrate; the improvement consisting of moving a source of electromagnetic radiation having a frequency in the radio frequency range relative to and over said polymer stratum near a surface thereof that is not in contact with said metal substrate for directing said radiation through said polymer stratum without heating thereof and onto said metal substrate in an area where said metal substrate is in said contacting relation with said polymer stratum and for briefly heating a surface portion of said metal substrate in said area by said radiation to a temperature at which said heat or melt bonding composition is capable of forming said interbonding connection, and continuously displacing said area by said movement of said source of said electromagnetic radiation relative to said substrate.

2. The process of claim 1, wherein said radiation has a frequency in the range of about 200 kilocycles per second to about 800 kilocycles per second.

3. The process of claim 1, wherein said source of said electromagnetic radiation is en elongated inductor loop shaped to substantially conform with said surface portion of said metal substrate.

4. The process of claim 3, wherein said elongated inductor loop is flexible.

5. The process of claim 3, wherein said inductor is operated with a power input of at least about 25 kilowatt per meter of the length of said inductor loop and wherein said frequency is in the range of from about 200 kilocycles per second to about 800 kilocycles per second.

6. The process of claim 1, wherein said polymer stratum including said heat or melt bonding composition is a normally flexible material having a layer of said heat or melt bonding composition and a layer of a second polymer composition.

7. The process of claim 6, wherein said second polymer composition is an olefinic polymer composition.

8. The process of claim 6, wherein said heat or melt bonding composition comprises a polymer selected from the group consisting of synthetic organic homopolymers and copolymers having recurring carboxylic groups in the molecular chain of said polymer.

9. The process of claim 6, wherein said source of said electromagnetic radiation is continuously moved relative to said stratum in physical contact with said second layer thereof so as to press said stratum onto said metal substrate.

10. The process of claim 3, wherein said metal substrate is a substantially continuous surface of a steel structure and wherein elongated web portions of said polymer stratum are laid onto said continuous surface for substantially covering the latter, said elongated inductor loop being moved over said elongated web portions as they are laid onto said continuous surface, and said elongated inductor loop extending transversely to and over the edges of each of said elongated web portions.

11. The process of claim 2, wherein said melt bonding composition is applied onto said metal substrate as a substantially continuous solid layer and wherein said elongated inductor loop is continuously moved relative to and over said solid layer in a contacting relation therewith.

12. The process of claim 4, wherein said elongated flexible inductor loop comprises a radiation-emitting flexible metallic conductor and a flexible non-metallic liquid-impervious tube forming at least one conduit for a fluid coolant that is substantially non-attenuating for said electromagnetic radiation when said non-metallic flexible tube surrounds said flexible metallic conductor.

13. In a process of producing a corrosion resistant coating on a structure having continuous steel surfaces by coating said surfaces with a substantially uniform layer of an organic polymer composition; the improvement consisting of arranging a polymer stratum including a heat or melt bonding polymer composition in a contacting relation with said surface; continuously moving a radio frequency emitter over said stratum for directing radio frequency radiation through said stratum and activating said heat or melt bonding polymer composition by means of heat produced by said radiation in an interface portion between said steel surface and said stratum.

* * * * *